(12) United States Patent
O'Brien et al.

(10) Patent No.: US 12,288,456 B2
(45) Date of Patent: Apr. 29, 2025

(54) BEHAVIOR DEVIATION DETECTION WITH ACTIVITY TIMING PREDICTION

(71) Applicant: Optum, Inc., Minnetonka, MN (US)

(72) Inventors: Megan O'Brien, Kildare (IE); Damian Kelly, Kildare (IE); Gregory Buckley, Dublin (IE); Colleen B. Caveney, Lowell, MA (US)

(73) Assignee: Optum, Inc., Minnetonka, MN (US)

( * ) Notice: Subject to any disclaimer, the term of this patent is extended or adjusted under 35 U.S.C. 154(b) by 421 days.

(21) Appl. No.: 17/516,037

(22) Filed: Nov. 1, 2021

(65) Prior Publication Data

US 2023/0137193 A1    May 4, 2023

(51) Int. Cl.
G08B 21/04 (2006.01)
G06N 20/00 (2019.01)

(52) U.S. Cl.
CPC ......... G08B 21/0423 (2013.01); G06N 20/00 (2019.01); G08B 21/0415 (2013.01); G08B 21/0438 (2013.01)

(58) Field of Classification Search
CPC ............ G08B 21/0423; G08B 21/0415; G08B 21/0438; G08B 21/0469; G06N 20/00
See application file for complete search history.

(56) References Cited

U.S. PATENT DOCUMENTS

| | | | |
|---|---|---|---|
| 6,796,799 B1 * | 9/2004 | Yoshiike | G08B 21/0476 434/236 |
| 7,369,680 B2 | 5/2008 | Trajkovic et al. | |
| 9,836,581 B2 | 12/2017 | Madan et al. | |
| 10,311,694 B2 | 6/2019 | McIntosh et al. | |
| 2003/0058111 A1 * | 3/2003 | Lee | G08B 13/19641 348/E7.086 |
| 2006/0089538 A1 | 4/2006 | Cuddihy et al. | |

(Continued)

OTHER PUBLICATIONS

"Livindi Smart Tablet & Care Button," (4 pages), (online), [Retrieved from the Internet Feb. 23, 2022] <URL: https://www.livindi.com/>.

(Continued)

Primary Examiner — Curtis J King
(74) Attorney, Agent, or Firm — Alston & Bird LLP

(57) ABSTRACT

Various embodiments provide methods, apparatus, systems, computing entities, and/or the like, for identifying deviated behavior of an individual indicated by outlying activity counts and outlying activity timings classified by a prediction interval profile generated from historical behavior data. In an embodiment, an example method comprises accessing sensor data describing behavioral activities of an individual during historical time periods and generating a prediction interval profile for the behavioral activities comprising a predicted count interval within a prediction time period for at least some behavioral activities. The method further includes receiving sensor data for the prediction time period and extracting an observed activity count and an observed activity timing for each behavioral activity. The method then includes classifying a particular behavioral activity as a behavioral deviation if the observed activity count does not satisfy the predicted count interval and/or if the observed activity timing does not satisfy the predicted timing interval.

20 Claims, 8 Drawing Sheets

(56) References Cited

U.S. PATENT DOCUMENTS

| | | | | |
|---|---|---|---|---|
| 2008/0025477 | A1* | 1/2008 | Farhan | G08B 21/0423 379/38 |
| 2009/0259728 | A1* | 10/2009 | Berisford | G08B 21/0492 709/206 |
| 2010/0145164 | A1 | 6/2010 | Howell | |
| 2016/0027278 | A1* | 1/2016 | McIntosh | G08B 21/0423 715/741 |
| 2016/0171378 | A1* | 6/2016 | Petersen | G06N 20/00 706/58 |
| 2017/0076576 | A1* | 3/2017 | Tan | G08B 21/0476 |
| 2017/0140628 | A1* | 5/2017 | Purdham | G08B 21/0423 |
| 2018/0082562 | A1* | 3/2018 | Ishida | G08B 21/0423 |
| 2018/0122209 | A1 | 5/2018 | Jefferson et al. | |
| 2018/0144605 | A1* | 5/2018 | Kusens | A61B 5/1115 |
| 2018/0254096 | A1 | 9/2018 | Karunanithi et al. | |
| 2018/0368684 | A1* | 12/2018 | Schmouker | A61B 5/0022 |
| 2019/0083005 | A1* | 3/2019 | Aarts | G08B 21/0469 |
| 2019/0103005 | A1* | 4/2019 | Gilberton | G10L 21/0224 |
| 2019/0122522 | A1* | 4/2019 | Stefanski | G08B 21/0423 |
| 2021/0057093 | A1* | 2/2021 | deSa | G08B 21/0423 |
| 2021/0057101 | A1 | 2/2021 | DeSa et al. | |
| 2021/0081844 | A1* | 3/2021 | Bhattacharya | G16Y 10/60 |
| 2021/0145323 | A1 | 5/2021 | Feuerstein | |
| 2021/0297167 | A1* | 9/2021 | Chen | H04W 24/08 |
| 2022/0165144 | A1* | 5/2022 | De Haes | G08B 7/06 |
| 2022/0230746 | A1* | 7/2022 | Anthapur | G08B 21/0415 |

OTHER PUBLICATIONS

Akl, Ahmad et al. "Unobtrusive Detection of Mild Cognitive Impairment in Older Adults Through Home Monitoring," In IEEE Journal of Biomedical and Health Informatics, vol. 21, No. 2, pp. 339-348, Mar. 2017, DOI: 10.1109/JBHI.2015.2512273.

Enshaeifar, Shirin et al. "Health Management and Pattern Analysis Of Daily Living Activities Of People With Dementia Using In-Home Sensors and Machine Learning Techniques," PLoS One, vol. 13, No. 5:e0195605, May 3, 2018, pp. 1-20, DOI: 10.1371/journal.pone.0195605.

Sprint, Gina et al. "Detecting Health and Behavior Change by Analyzing Smart Home Sensor Data," 2016 IEEE International Conference on Smart Computing (SMARTCOMP), May 18-20, 2016, (3 pages), DOI: 10.1109/SMARTCOMP.2016.7501687, St. Louis, MO, USA.

Sridevi, U.K. et al. "Elderly Behavior Prediction Using A Deep Learning Model In Smart Homes," In Applications of Deep Learning and Big IoT on Personalized Healthcare Services, Jan. 2020, IGI Global, pp. 115-131, DOI:10.4018/978-1-7998-2101-4.ch008.

Wikipedia Contributors. "Student's t-Distribution," Wikipedia, The Free Encyclopedia, Dec. 12, 2021, (21 pages), Available online: https://en.wikipedia.org/w/index.php?title=Student%27s_t-distribution &oldid=1059888640.

* cited by examiner

BEHAVIOR DEVIATION DETECTION WITH ACTIVITY TIMING PREDICTION

BACKGROUND

Various embodiments of the present disclosure address technical challenges related to performing predictive data analysis operations for automated behavioral monitoring for an individual in order to identify deviated or outlying behavior of the individual.

BRIEF SUMMARY

In general, embodiments of the present disclosure provide methods, apparatus, systems, computing devices, computing entities, and/or the like for identifying deviated or outlying behavior of an individual through sensor data and a prediction interval profile. The prediction interval profile may include predicted count intervals and predicted timing intervals for each behavioral activity performed by the individual within a prediction time period. In particular, a predicted count interval for a behavioral activity comprises a predicted minimum and a predicted maximum of occurrences of a corresponding behavioral activity within the prediction time period. Meanwhile, a predicted timing interval for a behavioral activity comprises a predicted start timepoint and a predicted end timepoint between which the behavioral activity is predicted to occur at least once, with both of the predicted earliest timepoint and the predicted latest timepoint being within the prediction time period.

The prediction interval profile, and the predicted count intervals and predicted timing intervals thereof, are generated using sensor data capturing behavior of the individual during one or more historical time periods, such that behavior predictions are based at least in part on historical behavior of the individual. The specific historical time periods used to generate the prediction interval profile may be selected based at least in part on similarity with the prediction time period. In various embodiments, a time clustering machine learning model is used to cluster time periods according to various time period features thereof, including but not limited to day of the week, activity count profiles, ambient temperature, and/or the like. Thus, as historical behavior of the individual may be habitual or at least vary for different historical time periods, particular relevant historical behavior is used to generate behavior predictions and the prediction interval profile.

In accordance with one aspect, a computer-implemented method is provided. The computer-implemented method may include the steps of accessing first sensor data for one or more historical time periods and describing a plurality behavioral activities during the one or more historical time periods; generating, based at least in part on the first sensor data, a prediction interval profile for the plurality of behavioral activities, the prediction interval profile comprising a predicted timing interval within a prediction time period for each of at least a subset of the plurality of behavioral activities; receiving second sensor data for the prediction time period; determining, based at least in part on the second sensor data, an observed activity count and an observed activity timing for each behavioral activity; determining one or more behavioral deviations by classifying a particular behavioral activity as a behavioral deviation based at least in part on the prediction interval profile and at least one of a respective observed activity count for the particular behavioral activity or a respective observed activity timing for the particular behavioral activity; and performing one or more automated actions based at least in part on the one or more behavioral deviations.

In accordance with another aspect, a computer program product is provided. The computer program product may include at least one computer-readable storage medium having computer-readable program code portions stored therein, the computer-readable program code portions including executable portions configured to cause at least one processor to access first sensor data for one or more historical time periods and describing a plurality of behavioral activities during the one or more historical time periods; generate, based at least in part on the first sensor data, a prediction interval profile for the plurality of behavioral activities, the prediction interval profile comprising a predicted timing interval within a prediction time period for each of at least a subset of the plurality of behavioral activities; receive second sensor data for the prediction time period; determine, based at least in part on the second sensor data, an observed activity count and an observed activity timing for each behavioral activity; determine one or more behavioral deviations by classifying a particular behavioral activity as a behavioral deviation based at least in part on the prediction interval profile and at least one of a respective observed activity count for the particular behavioral activity or a respective observed activity timing for the particular behavioral activity; and perform one or more automated actions based at least in part on the one or more behavioral deviations.

In accordance with yet another aspect, an apparatus including a processor and at least one memory including computer program code is provided. In various embodiments, the at least one memory and the computer program code are configured to, with the processor, cause the apparatus to access first sensor data for one or more historical time periods and describing a plurality behavioral activities during the one or more historical time periods; generate, based at least in part on the first sensor data, a prediction interval profile for the plurality of behavioral activities, the prediction interval profile comprising a predicted timing interval within a prediction time period for at least a subset of the plurality of behavioral activities; receive second sensor data for the prediction time period; determine, based at least in part on the second sensor data, an observed activity count and an observed activity timing for each behavioral activity; determine one or more behavioral deviations by classifying a particular behavioral activity as a behavioral deviation based at least in part on the prediction interval profile and at least one of a respective observed activity count for the particular behavioral activity or a respective observed activity timing for the particular behavioral activity; and perform one or more automated actions based at least in part on the one or more behavioral deviations.

BRIEF DESCRIPTION OF THE DRAWINGS

Having thus described the invention in general terms, reference will now be made to the accompanying drawings, which are not necessarily drawn to scale.

Figure 1:
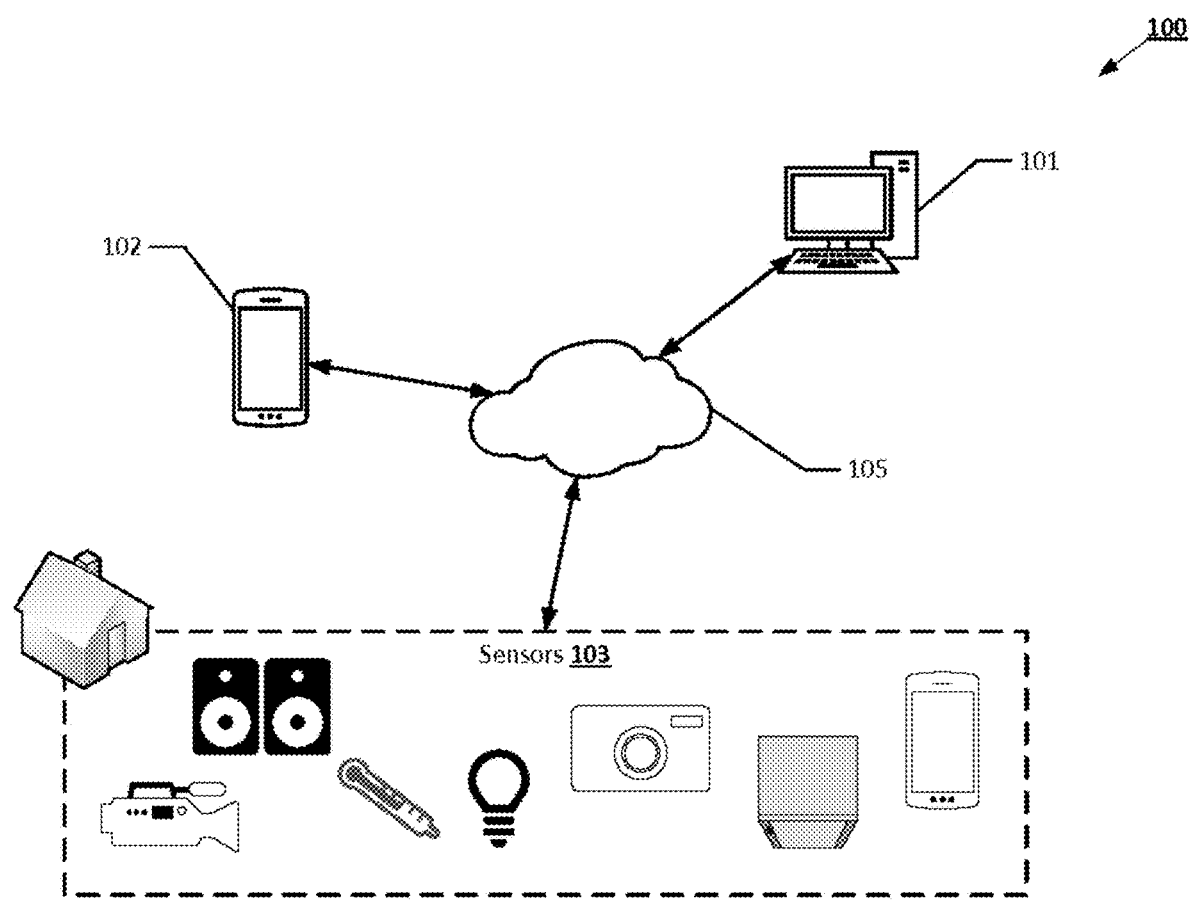

FIG. 1 provides an exemplary overview of an architecture that may be used to practice embodiments of the present disclosure.

Figure 2:
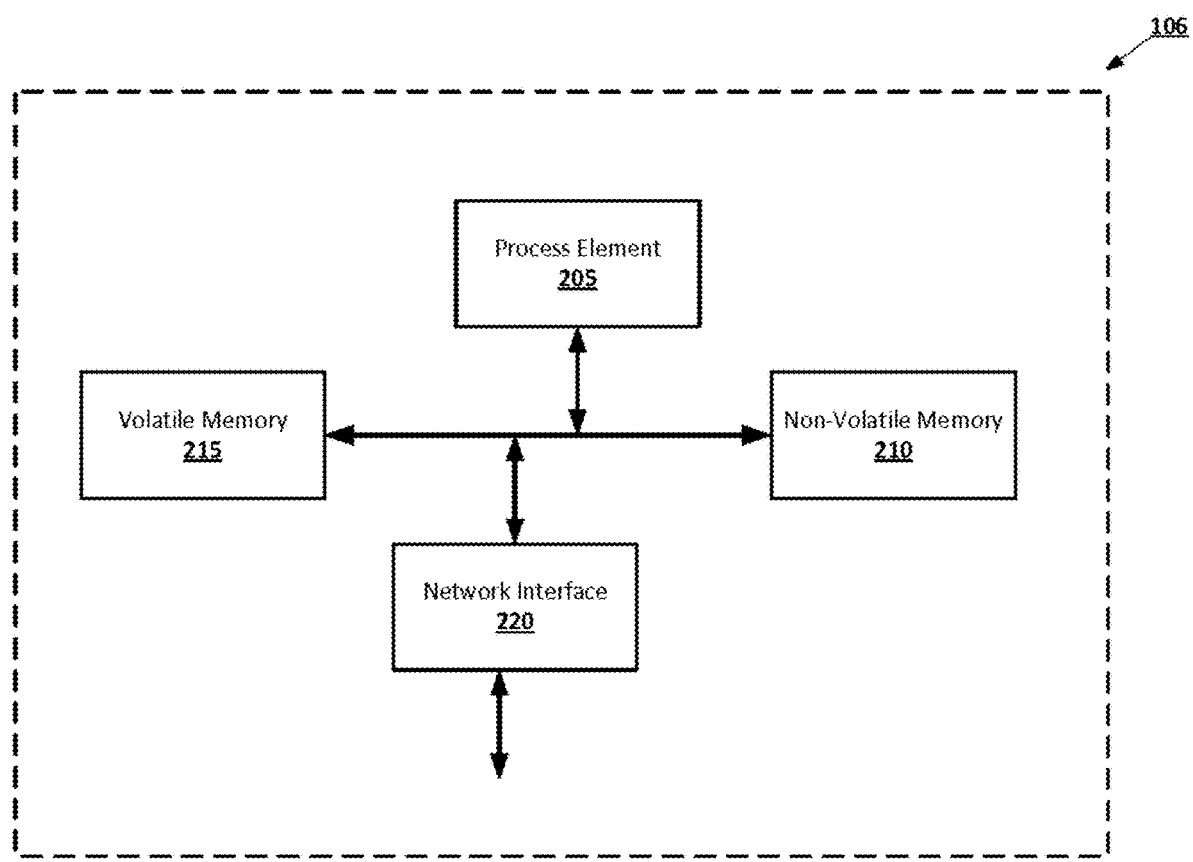

FIG. 2 provides a diagram of an example system computing entity, in accordance with some embodiments discussed herein.

Figure 3:
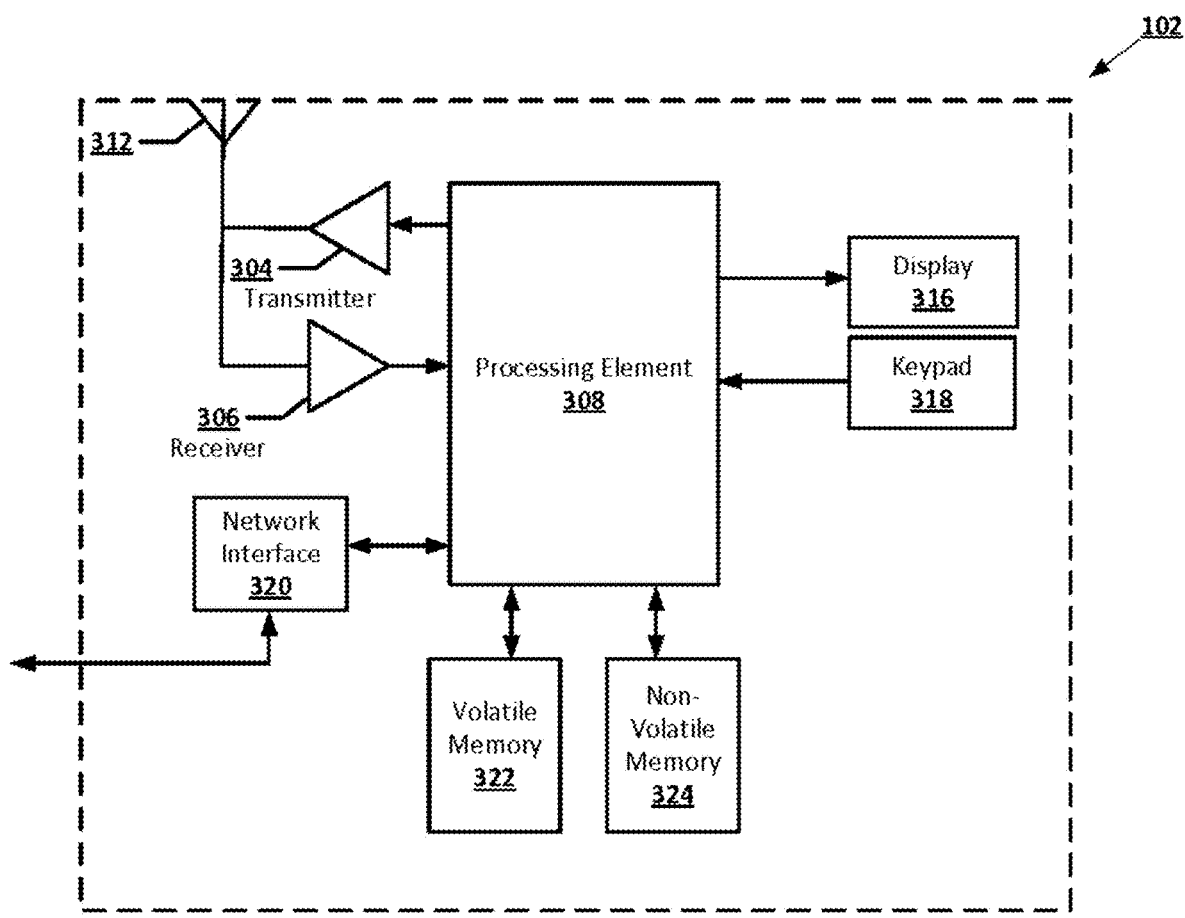

FIG. 3 provides a diagram of an example client computing entity, in accordance with some embodiments discussed herein.

Figure 4:
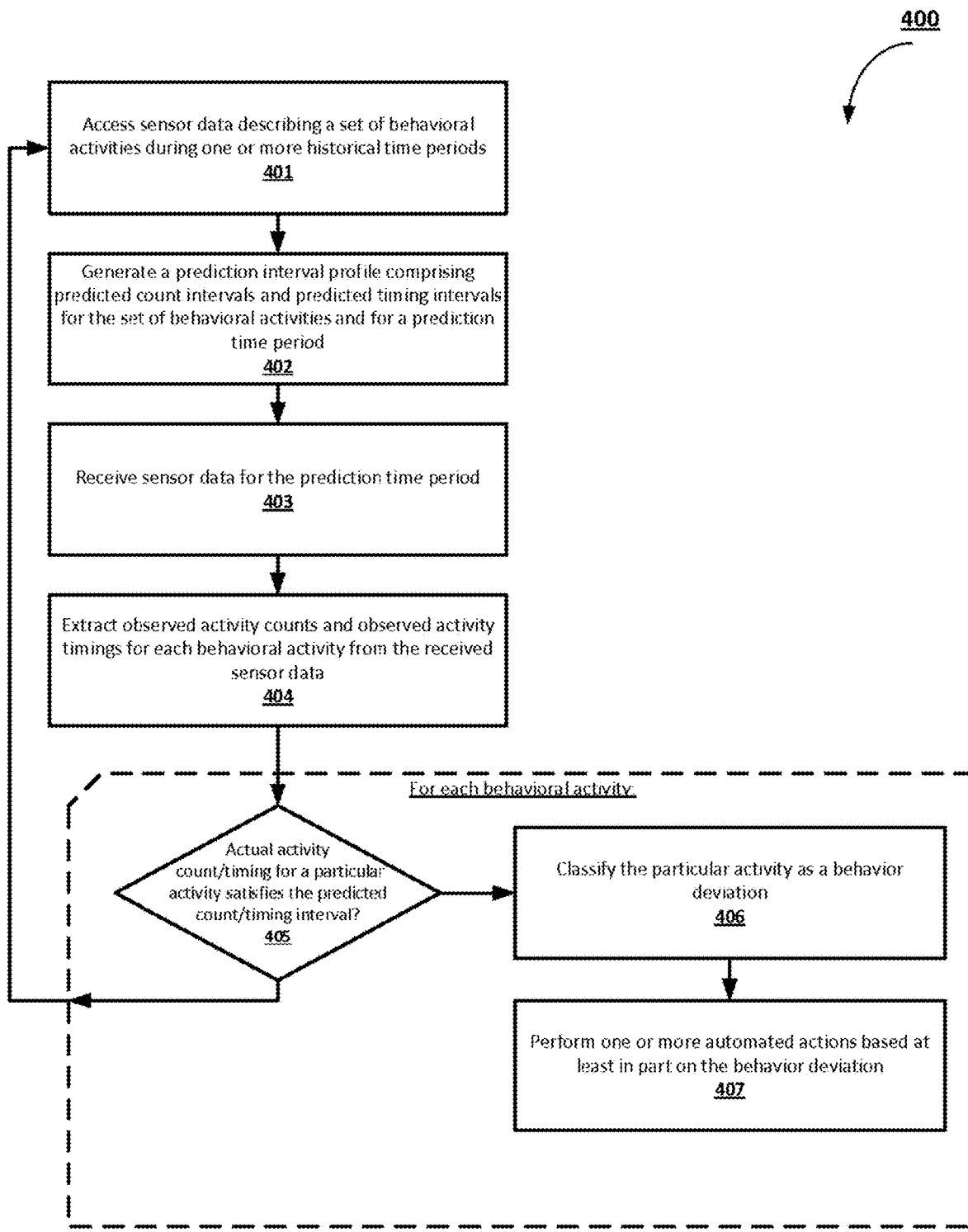

FIG. 4 provides a flowchart diagram of an example process for identifying deviated or outlying behavior with predicted count intervals and predicted timing intervals for various behavioral activities, in accordance with some embodiments discussed herein.

Figure 5A:
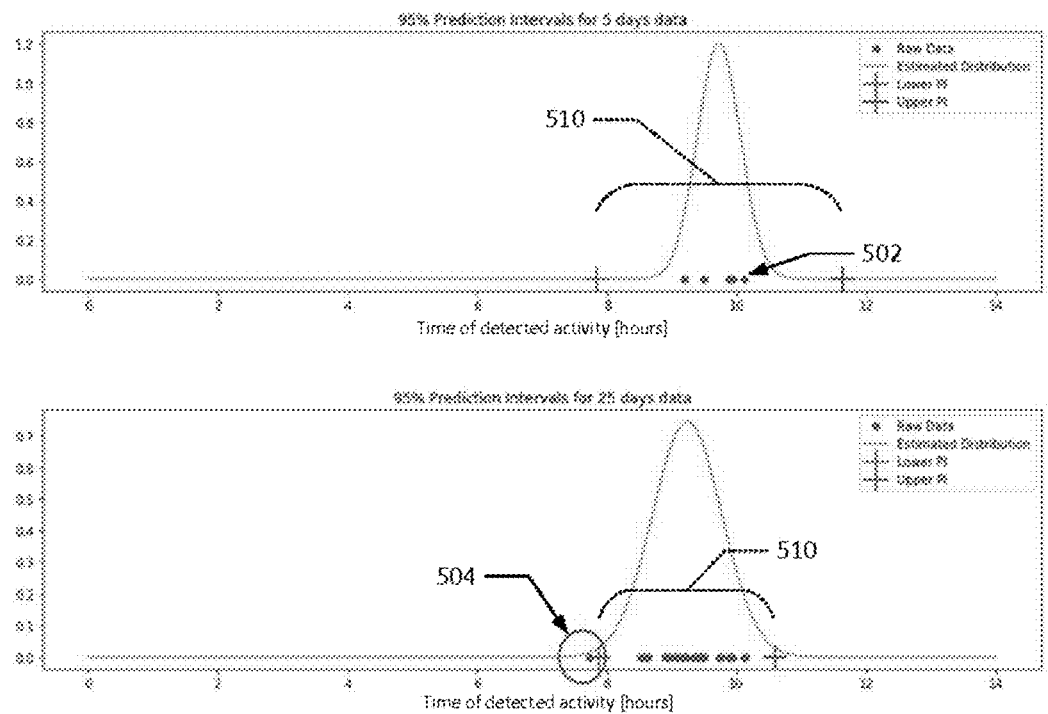

FIG. 5A illustrates example predicted timing intervals and identification of deviated or outlying behavior using the example predicted timing intervals, in accordance with some embodiments discussed herein.

Figure 5B:
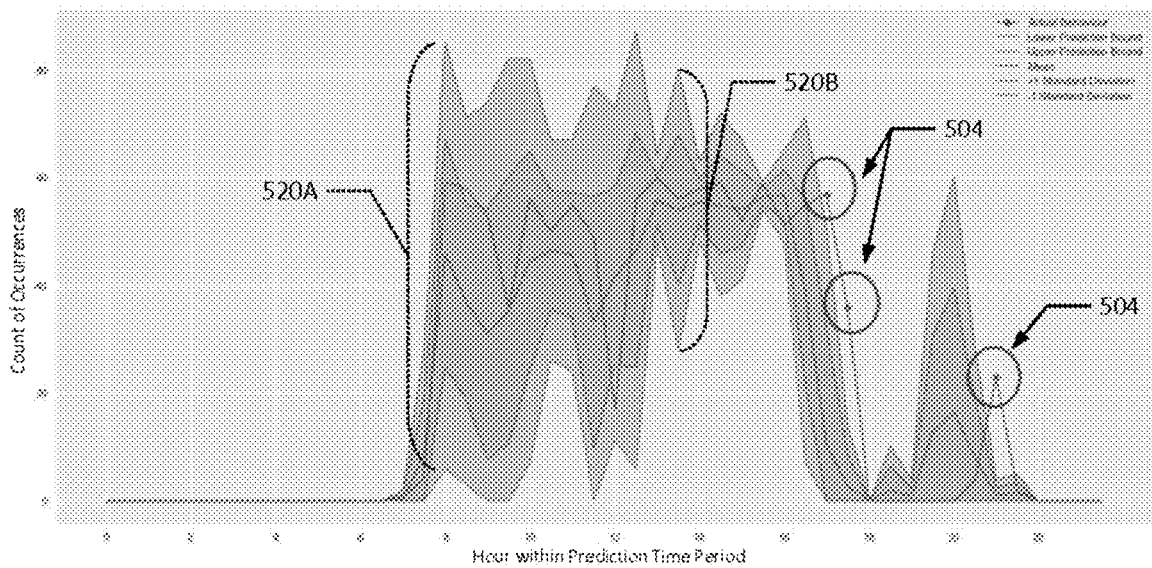

FIG. 5B illustrates a plurality of example predicted count intervals and identification of deviated or outlying behavior using the example predicted count intervals, in accordance with some embodiments discussed herein.

Figure 6:
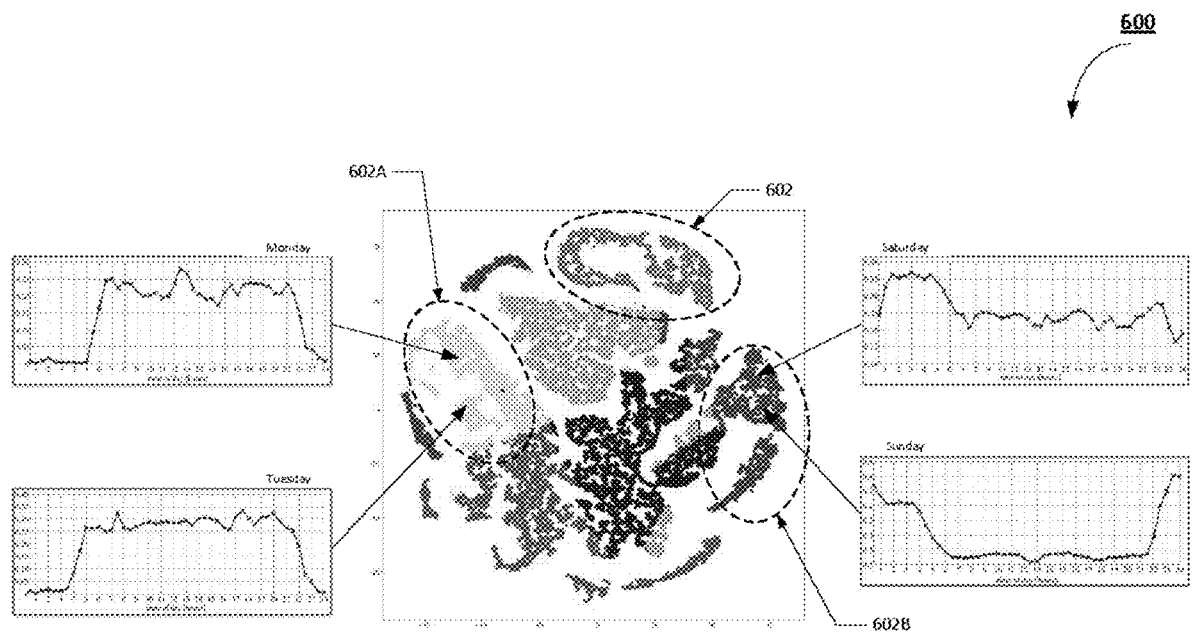

FIG. 6 illustrates an example time clustering machine learning model for clustering similar time periods according to various time period features, in accordance with some embodiments discussed herein.

Figure 7:

FIG. 7 illustrates an example survey configured to be automatically provided based at least in part on identification of one or more deviated or outlying behaviors of the individual, in accordance with some embodiments discussed herein.

Figure 8:

FIG. 8 provides an example user interface for monitoring behavior of an individual and configured to alert a user to deviated or outlying behavior, in accordance with some embodiments discussed herein.

DETAILED DESCRIPTION

Various embodiments of the present disclosure now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to providing text-based summarizations of conversations, one of ordinary skill in the art will recognize that the disclosed concepts can be used in other summarization and/or text extraction applications.

I. Overview and Technical Improvements

Various embodiments of the present disclosure address technical challenges related to behavioral monitoring and identification of deviated (e.g., abnormal, outlying) behavior. In particular, various embodiments of the present disclosure improve accuracy of identification of behavioral deviations by predicting and observing a count or volume of occurrences of particular behavioral activities and by predicting and observing a timing of the occurrences of the particular behavioral activities. Thus, various embodiments introduce analysis of behavior (e.g., discretely-defined behavioral activities) along a temporal dimension, thereby enabling deviated behavior to be accurately detected and uncovered. It may be understood that predicting and observing timings of occurrences of behavioral activities particularly improves sensitivity of deviated behavior identification by identifying more deviated behaviors that are undetectable by existing methods and systems. Behavioral activities that typically have low frequency of occurrence are unreliably and inaccurately classified as behavioral deviations when limiting analysis to predicting and observing a count of occurrences. For example, in an exemplary embodiment, prediction and observation of an individual leaving the house once a day is unreliable and inaccurate for classification of behavioral deviations, while predicting and observing the times at which the individual leaves the house has increased informational significance for deviation classification.

In various embodiments, predicting a count and a timing of occurrences of the particular behavioral activities comprises the generation of a prediction interval profile that comprises, for each of a set of behavioral activities, a predicted count interval and a predicted timing interval, each relevant to a prediction time period. A predicted count interval for a behavioral activity is used to predict a minimum and a maximum number of occurrences of the behavioral activity within the prediction time period. Similarly, a predicted timing interval for a behavioral activity is used to predict a start timepoint and an end timepoint between which the behavioral activity is predicted to occur at least one, both the start timepoint and the end timepoint being within the prediction time period.

The prediction interval profile (e.g., the predicted count intervals and the predicted timing intervals thereof) may be generated according to sensor data describing behavior during one or more historical time periods. As such, the behavioral predictions for the prediction time period are based at least in part on historical behavior of the individual. In particular, sensor data used to generate the prediction interval profile are associated with specifically selected historical time periods that are determined to be similar to the prediction time period. In various embodiments, a time clustering machine learning model is used to cluster and group time periods according to various features, and historical time periods belonging to the cluster that includes the prediction time period, or belonging to a cluster having a common feature(s) shared by the prediction time period, are selected for the generation of the prediction interval profile.

As an example, historical Mondays are selected for the generation of the predicted count intervals and predicted timing intervals relevant to a Monday for which behavior of the individual is monitored (e.g., a current Monday, a future Monday). As another example, the features include observed activity timings. Observed activity timings for historical time periods may reveal that the individual performs similar behaviors on the first day of each month, and thus, such historical time periods that include the first day of months are used for generation of a prediction interval profile relevant to another first day of a month.

With specific historical time periods being selected (e.g., using a time clustering machine learning model) for behavior predictions (e.g., predicted count or volume, predicted timings), various embodiments improve accuracy of behavior predictions. As will be understood, use of historical data that is highly specific and relevant to a prediction time period and that is determined to be inter-related and similar for the generation of behavioral predictions improves the specificity of behavioral deviation identification and classification. That is, more behavioral activities that are not deviated or abnormal are accurately classified as being normal (e.g., not a behavioral deviation). Further, various embodiments do not require a large amount of historical data for accurate identification of behavioral deviations. As such, data storage space that would be used for storing historical data and computing resources dedicated to identifying, accessing, retrieving, and/or the like historical data are both conserved.

In general then, various embodiments of the present disclosure provide for accurate identification of behavioral deviations during a prediction time period due at least in part to generation of behavioral predictions using specifically selected historical time periods similar to the prediction time period and further due at least in part to predicting and observing timings (e.g., within historical time periods, within the prediction time period) of occurrences of behavioral activities. Improved accuracy in this regard advantageously improves efficiency in the use of data storage space and computing resources.

II. Exemplary Definitions of Certain Terms

The term "behavioral activity" may refer to a data entity describing a discrete action performed by an individual. A behavioral activity is described by data collected by one or more sensors configured to monitor behavior and actions of the individual. A behavioral activity may then be detected, identified, extracted, and/or the like from sensor data based at least in part on particular data values, data patterns, and/or the like. An example behavioral activity may describe the individual getting out of bed and may be detected according to data collected by motion sensors oriented towards or positioned near the bed of the individual. Another example behavioral activity may describe the individual opening a refrigerator (e.g., which may be indicative of food preparation and/or meal consumption) and may be extracted from data recorded by the refrigerator (e.g., a smart refrigerator device) and/or sensors thereof. Yet another example behavior activity may describe the individual walking down a staircase and may be identified based at least in part on both data collected by a first motion sensor at the top of the staircase and data collected by a second motion sensor at the bottom of the staircase. A further example behavior activity may describe the individual entering/exiting a room and may be detected based at least in part on data describing a light switch in the room being toggled. As described, a behavioral activity can be defined by and detected from particular data values (e.g., a door sensor indicating an open position, a light switch sensor indicating a toggle) and/or particular data patterns from multiple sensors (e.g., motion at the top and the bottom of a staircase). In various embodiments, a detected behavioral activity is associated with a timestamp, or a point in time at which the discrete action described by the behavioral activity occurred or was performed by the individual.

The term "prediction interval profile" may refer to a data entity that is configured to describe predicted activity counts and activity timings for a prediction time period and to classify behavioral activities detected during the prediction time period using the predicted activity counts and the predicted activity timings. In some embodiments, the prediction interval profile comprises a predicted count interval and a predicted timing interval for a behavioral activity, with the predicted count interval predicting the number of occurrences of the behavioral activity within the prediction time period and the predicted timing interval predicting when the behavioral activity may occur within the prediction time period. Upon receiving actual (e.g., true, empirical, observed) sensor data for the prediction time period, the prediction interval profile may be configured to classify each of the set of behavioral activities as normal or deviations based at least in part on whether the predicted count intervals and the predicted timing intervals are satisfied.

The term "predicted count interval" may refer to a data entity that is configured to describe a predicted number of occurrences of a behavioral activity during a prediction time period. A predicted count interval may predict a cumulative number of occurrences during the prediction time period, or the predicted count interval may predict a time-specific (e.g., time-variable, time-dependent) number of occurrences over the prediction time period. In some embodiments, a prediction interval profile is generated to include one or both of (i) a predicted count interval predicting cumulative occurrences for the prediction time period, and (ii) a predicted count interval predicting time-specific occurrences over the prediction time period for each behavioral activity. Generally, a predicted count interval comprises a predicted minimum (e.g., lower bound) and a predicted maximum (e.g., upper bound) number of occurrences of the behavioral activity. The predicted minimum and the predicted maximum may be determined according to a density distribution (e.g., a probability density function) of the behavioral activity generated from historical data. For example, in an exemplary embodiment, the predicted minimum and the predicted maximum are determined using an average number of occurrences and a standard deviation in the number of occurrences and may be understood similar to a confidence interval with regard to how many times the behavioral activity may occur within the prediction time period (e.g., 68% confidence interval, 95% confidence interval, 99.7% confidence interval).

The term "observed activity count" may refer to a data entity that is configured to describe an actual, real/empirical/true number of occurrences of a behavioral activity during a prediction time period. An observed activity count for a given behavioral activity can be determined based at least in part on identifying data values, data patterns, and/or the like defining the given behavioral activity (e.g., data values describing light switch toggling, data patterns describing walking down a staircase) within received sensor data for the prediction time period. An observed activity count may describe a cumulative number of occurrences for the prediction time period. Alternatively, an observed activity count may include time-specific (e.g., time-variable, time-dependent) numbers of occurrences for the prediction time period. For example, in an exemplary embodiment, the prediction time period is a day, and the observed activity count includes time-specific numbers of occurrences for each hour of the prediction time period. In various embodiments, both an observed activity count describing cumulative occurrences and an observed activity count describing time-specific occurrences are determined and extracted from received sensor data. Various embodiments provide for comparison of observed activity counts with predicted count intervals, and the observed activity counts not satisfying the predicted count intervals may suggest or indicate behavioral deviations.

The term "predicted timing interval" may refer to a data entity that is configured to predict when a behavioral activity will occur at least once within a prediction time period. Generally, a predicted timing interval comprises a predicted start timepoint and a predicted end timepoint between which occurrences of the behavioral activity are predicted to occur, with both the predicted start timepoint and the predicted end timepoint being within the prediction time period. As an example, the prediction time period is a day, and the behavioral activity of an individual getting out of bed is predicted to occur between 8 AM and 10 AM (e.g., 8 AM is the predicted start timepoint and 10 AM is the predicted end timepoint). The prediction time period (e.g., the predicted start timepoint and the predicted end timepoint) may be probabilistic and may be determined according to a density distribution (e.g., a probability density function) of occurrences of the behavioral activity over time from historical data. For example, in an exemplary embodiment, the predicted start timepoint and the predicted end timepoint may be determined using an average occurrence time and a standard deviation in occurrence times. In some example instances, the predicted timing interval may be understood to be similar to a confidence interval with regard to the when the behavioral activity may occur. A predicted timing interval may be agnostic as to the volume of occurrences and only serves to predict when the behavioral activity occurs at least once.

The term "observed activity timing" may refer to a data entity that is configured to describe an actual, real/empirical/true time at which the behavioral activity may occur within the prediction time period. For example, in an exemplary embodiment, the prediction time period is a day, and the observed activity timing describes that the behavioral activity occurred at 9:30 AM. An observed activity timing may be a timestamp of an occurrence of the behavioral activity, and a behavioral activity may have multiple observed activity timings for repeated occurrences during the prediction time period. An observed activity timing may be determined based at least in part on identifying and extracting particular data values, data patterns, and/or the like defining the behavioral activity within received sensor data for the prediction time period. The received sensor data may comprise timestamps for different portions of data, and the observed activity timing for an occurrence is determined from such a timestamp. In some embodiments, the sensor data for the prediction time period is received in real-time and, and the observed activity timing is determined based at least in part on detecting an occurrence in real-time.

The term "behavioral deviation" may refer to a data entity that is configured to describe a behavioral activity that is determined to be abnormal or an outlier with respect to historical behavior of the individual. A behavioral activity may be determined to be a behavioral deviation based at least in part on how many times the behavioral activity occurs within a prediction time period and when the behavioral activity occurs within the prediction time period (e.g., the individual historically gets out of bed at 8 AM but gets out of bed at 11 AM during the prediction time period). In particular, observed activity counts for a behavioral activity are compared to predicted count intervals for the behavioral activity, and if the observed activity counts do not satisfy the predicted count intervals (e.g., are not within, are not described by), then the behavioral activity may be determined to be a behavioral deviation. Similarly, observed activity timings for a behavioral activity are compared to a predicted timing interval for the behavioral activity, and if the observed activity timings do not satisfy the predicted timing interval, then the behavioral activity may be determined to be a behavioral deviation. In some example embodiments, a behavioral activity is determined to be a behavioral deviation if both (i) observed activity counts do not satisfy predicted count intervals, and (ii) observed activity timings do not satisfy predicted timing intervals.

The term "time clustering machine learning model" may refer to a data entity that is configured to group or cluster time periods according to one or more time period features. That is, a time clustering machine learning model may output clusters of time periods, and a cluster includes time periods that are similar in the one or more time period features. In various embodiments, the one or more time period features include week positions (e.g., Mondays are clustered together, Tuesdays are clustered together, etc.), months, seasons, and/or the like. Further, time periods can be clustered based at least in part on observed activity counts and observed activity timings. For example, in an exemplary embodiment, days with similar activity counts are clustered together, which may indicate higher-level patterns such as repeated behavior. Various other aspects associated with each time period, such as weather, can be used to cluster time periods together. Generally then, the time clustering machine learning model is configured to extract or determine time period features from a plurality of time periods in order to cluster the plurality of time periods into one or more clusters. In various embodiments, historical time periods belonging to a cluster that includes the prediction time period are used for generating the prediction interval profile, as the behavior during the prediction time period may be similar to the behavior during the historical time periods.

III. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example system architecture 100 for identifying deviated or outlying behavior of an individual based at least in part on activity occurrence volume (e.g., counts) and activity occurrence timing within a prediction time window. For example, the system architecture 100 may be used to monitor the behavior of an individual over time through collection of sensor data and to classify said behavior during a prediction time period using a prediction interval profile generated from historical sensor data. As illustrated, the system architecture 100 includes a system computing entity 101. In various embodiments, the system computing entity 101 is configured to generate a prediction interval profile that comprises predicted count intervals and predicted timing intervals for behavioral activities and to classify behavior (and behavioral activities thereof) as normal or deviated using the prediction interval profile. The system computing entity 101 may be configured to remotely monitor behavior of the individual and remotely provide alerts to the individual and/or other relevant entities (e.g., care physician, family members) indicating behavioral deviations. For instance, the system computing entity 101 may be associated with (e.g., operated by) an entity responsible for the care of individuals or having some interest (e.g., vested, familial) in the behavior of the individual.

As illustrated, the system architecture 100 comprises a client computing entity 102. The client computing entity 102 is a personal device of the individual whose behavior is monitored or a device otherwise associated with the individual. In some example embodiments, the client computing entity 102 is similarly configured to identify deviated behaviors of the individual based at least in part on generating a prediction interval profile that comprises predicted count intervals and predicted timing intervals. In some other example embodiments, the client computing entity 102 may be configured to provide data to the system computing entity 101 for classification of behavioral activities and to receive an indication of whether the behavior of the individual is deviated or outlying. In some instance, the client computing entity 102, being associated with the individual, is configured to alert the individual of the individual's abnormal and deviated behavior.

In any regard, the client computing entity 102 may be configured to collect sensor data originating from sensors 103 and may do so over various time periods, including historical time periods and a prediction time period. In some example instances, the prediction time period is a current time period, and the client computing entity 102 collects sensor data in real-time. In some embodiments, the client computing entity 102 is configured to generate a prediction interval profile from sensor data captured during one or more historical time periods and to classify behavioral activities extracted from sensor data captured during a prediction time period as behavioral deviations using the prediction interval profile. In some other example embodiments, the client computing entity 102 is configured to provide sensor data captured during historical time periods and sensor data captured during a prediction time period to a system computing entity 101 for classification of behavioral activities and identification of behavioral deviations. In various embodiments, a client computing entity 102 associated with an individual is configured to provide and display sensor data and various other behavioral data (e.g., observed activity counts, observed activity timings) to the individual via display, such as via a user interface. Thus, an individual may be provided with and may view data describing the individual's own behavior.

Thus, sensor data captured by sensors 103 may be provided to the client computing entity 102. Sensor data captured by sensors 103 may be provided to the system computing entity 101 indirectly (e.g., via client computing entity 102), or may be provided directly to the system computing entity 101 in some embodiments. Generally, sensors 103 capture sensor data that describes behavior including behavioral activities of the individual, and in various embodiments, sensors 103 are positioned within a home to monitor the behavior of the individual within the home. It will be understood that while various embodiments of the present disclosure are described herein in the context of behavior of an individual within a home of the individual, various embodiments may relate to monitoring behavior and identifying deviated behavior in different settings including a hospital, an office, a facility, and/or any similarly suitable environment.

Sensors 103 may include motion sensors, cameras, temperature/thermal sensors, magnetic sensors, microphones, and/or the like. Sensors 103 may also include devices including medicine dispensers, smart refrigerators, smart speakers, Internet-of-Things (IoT) devices, exercise devices (e.g., a stationary bike, a treadmill), and/or the like. In some embodiments, the client computing entity 102 comprises one or more of the sensors 103. For example, in an exemplary embodiment, the client computing entity 102 is a cell phone comprising gyroscopes, accelerometers, cameras, microphones, and/or the like.

Certain sensors may be configured to monitor certain behavioral activities. For instance, one or more motion sensors may be positioned and oriented to capture sensor data describing an individual's entry into a specific room. As another example, a smart refrigerator is configured to capture (e.g., record) sensor data describing the individual opening a door of the smart refrigerator and/or accessing certain portions of the refrigerator. Sensor data captured by the sensors 103 may be associated with timestamps, such that the sensor data is configured to describe at time at which a described behavioral activity occurred.

Generally then, the system architecture 100 comprises sensors 103 that capture sensor data that may describe behavioral activities of the individual as they occur, and the sensors 103 may communicate the sensor data to the client computing entity 102 and/or the system computing entity 101. In various embodiments, the sensors 103 are configured to provide sensor data to the client computing entity 102 and/or the system computing entity 101 in real-time and/or on a periodic basis. Each of the sensors 103 may be configured to capture and provide sensor data at a respective frequency.

In various embodiments, components of the system architecture 100, including the system computing entity 101, the client computing entity 102, and the sensors 103, may communicate with at least one of each other using one or more communication networks 105. Examples of communication networks 105 include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

Exemplary Computing Entities

In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

FIG. 2 provides a schematic of a system computing entity 101, according to one embodiment of the present disclosure. As shown in FIG. 2, in one embodiment, the system computing entity 101 may include, or be in communication with, one or more processing elements 205 (also referred to as processors, processing circuitry, and/or similar terms used herein interchangeably) that communicate with other elements within the system computing entity 101 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the system computing entity 101 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media 210 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the system computing entity 101 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the system computing entity 101 with the assistance of the processing element 205 and operating system.

As indicated, in one embodiment, the system computing entity 101 may also include one or more network interfaces 220 for communicating with various computing entities (e.g., one or more other system computing entities 101, one or more client computing entities 102), such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system computing entity 101 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the system computing entity 101 may include, or be in communication with, one or more input elements, such as a keyboard input, a mouse input, a touch screen/display input, motion input, movement input, audio input, pointing device input, joystick input, keypad input, and/or the like. The system computing entity 101 may also include, or be in communication with, one or more output elements (not shown), such as audio output, video output, screen/display output, motion output, movement output, and/or the like.

FIG. 3 provides a schematic of an example client computing entity 102 that may be used in conjunction with embodiments of the present disclosure. Client computing entities 102 can be operated by or associated with various individuals, and the system architecture 100 may include one or more client computing entities 102. That is, the system computing entity 101 may be configured to monitor behavior of multiple different individuals associated with different client computing entities 102 and individually detect and alert behavioral deviations to a client computing entity 102. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the system computing entity 101. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the system computing entity 101 via a network interface 320.

Via these communication standards and protocols, the client computing entity 102 can communicate with various other entities (e.g., system computing entities 101, a storage subsystem) using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the system computing entity 101, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the system computing entity 101, various other computing entities, and/or a storage subsystem.

In another embodiment, the client computing entity 102 may include one or more components or functionality that are the same or similar to those of the system computing entity 101, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

Various embodiments of the present disclosure address technical challenges related to identifying deviations in behavior of an individual. In particular, various embodiments improve the accuracy of behavioral deviation detection and classification due at least in part to prediction and observation of both a count and a timing of occurrences of behavioral activities. Examination of when a behavioral activity occurs for different time periods provides increased information significance in instances in which the behavioral activity has low frequency of occurrence (e.g., once a day). Improved accuracy in detection and classification of behavioral deviations enables conservation of data storage space and computing resources. Further, specific selection of historical data for generation of behavioral predictions maintains classification accuracy in instances in which low quantities of historical data are available and also enables conservation of data storage space.

FIG. 4 provides a flowchart diagram of an example process 400 for identifying deviations in behavior during a prediction time period according to predicted counts and predicted timings for behavioral activities. In various embodiments, the system computing entity 101 comprises means, such as the processing elements 205, memory media 210, 215, network interface 220, and/or the like, for identifying deviations in behavior during a prediction time period according to predicted counts and predicted timings for behavioral activities and for performing steps/operations of process 400. In various embodiments, the client computing entity 102 comprises means, such as processing elements 308, memories 322, 324, network interface 320, and/or the like, for identifying deviations in behavior during a prediction time period according to predicted counts and predicted timings for behavioral activities and for performing steps/operations of process 400.

Process 400 comprises step/operation 401, at which sensor data describing historical behavior of an individual during one or more historical time periods is accessed. In various embodiments, the system computing entity 101 accesses the sensor data from memory media 210, 215, from a database via network interface 220, and/or the like. In various embodiments, the client computing entity 102 collects and accesses sensor data from sensors 103 and may do so in real-time or on a periodic basis.

The historical behavior described by the sensor data may be defined as a set of different behavioral activities. In various embodiments, a behavioral activity is a discrete action performed by an individual and may be defined by particular data values, data patterns, and/or the like. An example behavioral activity may describe the individual getting out of bed and may be detected according to data collected by motion sensors oriented towards or positioned near the bed of the individual (e.g., motion sensor data satisfying one or more movement thresholds to indicate movement of the individual around the bed). Another example behavioral activity may describe the individual opening a refrigerator (e.g., which may be indicative of food preparation and/or meal consumption) and may be extracted from data recorded by the refrigerator (e.g., a smart refrigerator device) and/or sensors thereof. Yet another example behavior activity may describe the individual walking down a staircase and may be identified based at least in part on both data collected by a first motion sensor at the top of the staircase and data collected by a second motion sensor at the bottom of the staircase. A further example behavior activity may describe the individual entering/exiting a room and may be detected based at least in part on data describing a light switch in the room being toggled. As described, a behavioral activity can be defined by and detected from particular data values (e.g., a door sensor indicating an open position, a light switch sensor indicating a toggle) and/or particular data patterns from multiple sensors (e.g., motion at the top and the bottom of a staircase).

In various embodiments, the individual is associated with a set of behavioral activities that may include behavioral activities of interest or behavioral activities to be monitored. For example, behavioral activities may be health-related, such as taking medicine from a medicine dispenser, the medicine dispenser being one of the sensors 103. Thus, in some embodiments, the set of behavioral activities is pre-configured, and the sensor data describes one or more of the set of behavioral activities.

At step/operation 402, a prediction interval profile is generated, and the prediction interval profile includes predicted count intervals and predicted timing intervals for each of the set of behavioral activities. The predicted count intervals and the predicted timing intervals of the prediction interval profile are relevant to and associated with a prediction time window. In an example embodiment, the prediction time window is an upcoming day. In various embodiments, the system computing entity 101 is configured to remotely monitor behavior of the individual and generates the prediction interval profile for identification of behavioral deviations for a prediction time window. In various other embodiments, the client computing entity 102 is configured and used for behavioral monitoring and may instead generate the prediction interval profile.

In various embodiments, the prediction interval profile is configured to predict activity counts and activity timings for a prediction time period and to classify behavioral activities detected during the prediction time period using the predicted activity counts and the predicted activity timings. In particular, the prediction interval profile comprises a predicted count interval and a predicted timing interval both associated with each behavioral activity, with the predicted count interval predicting the number of occurrences of the behavioral activity within the prediction time period and the predicted timing interval predicting when the behavioral activity may occur within the prediction time period. Upon receiving actual (e.g., true, empirical, observed) sensor data for the prediction time period, the prediction interval profile may be configured to classify each of the set of behavioral activities as normal or deviations based at least in part on whether the predicted count intervals and the predicted timing intervals are satisfied.

Thus, generating prediction interval profile may comprise generation of a predicted count interval for each behavioral activity and generation of a predicted timing interval for each behavioral activity, with the predicted count intervals and the predicted timing intervals being behavioral predictions for the prediction time period. As previously discussed, the prediction time period may be a current time period, an upcoming time period, a future time period, and/or the like.

Referring now to FIG. 5A, example predicted timing intervals 510 for a given behavioral activity within a prediction time window are illustrated. FIG. 5A illustrates two plots each describing activity timings during a prediction time period. In the illustrated embodiment, the prediction time period spans approximately fourteen hours, as shown in the horizontal axis of two plots. The illustrated plots further illustrate estimated probability distributions. The estimated probability distributions indicate probabilities of occurrence of a given behavioral activity at different points of time during the prediction time period. For example, in the lower plot, the given behavioral activity is most likely to occur at around nine hours into the prediction time period. In various embodiments, the predicted timing intervals 510 are probabilistic and based at least in part on predicted probabilities of occurrence for different points of time during the prediction time period.

In the upper plot of FIG. 5A, the predicted timing interval 510 for the given behavioral activity spans from approximately an $8^{th}$-hour timepoint and $11.5^{th}$-hour timepoint. Thus, the illustrated embodiment of a predicted timing interval 510 represents a prediction that the given behavioral activity is most likely to occur at least once between 8 hours and 11.5 hours into the prediction time period. The $8^{th}$-hour timepoint functions as a predicted start timepoint, and the $11.5^{th}$-hour timepoint represents a predicted end timepoint.

In various embodiments, the predicted timing interval 510 (e.g., 8 hours to 11.5 hours) is generated or determined based at least in part on the accessed sensor data describing behavior during the historical time periods. In particular, the predicted timing interval 510 for the given behavioral activity is generated based at least in part on historically observed timings of occurrences of the given behavioral activity during the historical time periods. In the illustrated embodiment, the predicted timing interval of the upper plot (e.g., 8 hours to 11.5 hours) is generated based at least in part on five historical occurrences 502 temporally positioned around 10 hours into respective historical time periods. It may be appreciated here that the historical time periods and the prediction time period may span the same amount of time and/or may be normalized (e.g., initialized at a $0^{th}$-hour), such that the historical occurrences 502 can be used to make temporal predictions within the prediction time period.

In various embodiments, the below Equation 1 may be used to generate a predicted timing interval 510 using the historical occurrences 502.

$$\left[\mu - t_n \frac{\sigma}{\sqrt{n}}, \mu + t_n \frac{\sigma}{\sqrt{n}}\right]$$ Equation 1

In Equation 1, y represents the average or mean of the historical occurrences 502. Specifically for the generation of predicted timing intervals, y describes the average timing of the historical occurrences 502 within respective historical time periods. In the illustrated embodiment, the average timing of the historical occurrences 502 shown in the upper plot may be approximately 9.75 hours into a time period (e.g., the prediction time period). As shown from Equation 1, the predicted timing interval 510 may then be centered around the average timing of the historical occurrences 502.

Also in Equation 1, $t_n$ describes the Student's t-distribution with (n−1) degrees of freedom, and n describes the number of historical occurrences used for generation of the behavioral prediction (e.g., predicted timing interval 510). In the upper plot of the illustrated embodiment, for example, n is five, due to five historical occurrences 502 being used. Further, u describes a standard deviation of the historical occurrences 502. Similar to y, u specifically describes a standard deviation of the timings of the historical occurrences 502 when generated a predicted timing interval using Equation 1. In all then, sample characteristics (e.g., average, standard deviation) of the timings of historical occurrences are used to predict timing of the given behavioral activity within the prediction time window through generation of a predicted timing interval (e.g., Equation 1).

It may be appreciated that, in the upper plot of the illustrated embodiment of FIG. 5A, the predicted timing interval 510 spans a wide range of time (e.g., 8 to 11.5 hours is an approximately 3.5 hour interval) due to the relatively low number (five) of historical occurrences 502 used to generate the predicted timing interval 510. Meanwhile, in the lower plot of FIG. 5A, twenty-five historical occurrences 502 are used for the generation of a predicted timing interval 510. As such, the predicted timing interval 510 of the lower plot spans a shorter amount of time due to the higher amount of historical data. In particular, the predicted timing interval 510 of the lower plot spans from approximately 7.75 hours to approximately 10.5 hours within the prediction time period, thus being an approximately 2.75 hour interval.

With generation of predicted timing intervals for each behavioral activity, the prediction interval profile may be configured to predict and classify timings of occurrences of the behavioral activity within the prediction time window. The lower plot of the FIG. 5A illustrates classification of an occurrence of the behavioral activity within the prediction time window. In the illustrated embodiment, the given behavioral activity occurs at approximately 7.5 hours into the prediction time window, thus being temporally positioned outside of the predicted timing interval 510 spanning from approximately 7.75 hours to approximately 10.5 hours. As such, the prediction interval profile may be configured to classify the behavioral activity, or the occurrence thereof at approximately 7.5 hours, as a behavioral deviation 504 for being temporally positioned outside of the predicted timing interval 510.

Turning now to FIG. 5B, example predicted count intervals 520 for a given behavioral activity are illustrated. Predicted count intervals 520 are configured to predict a number of occurrences of a behavioral activity during a prediction time period. A predicted count interval 520 may predict a cumulative number of occurrences during the prediction time period, or the predicted count interval may predict a time-specific (e.g., time-variable, time-dependent) number of occurrences over the prediction time period. In some embodiments, a prediction interval profile is generated to include one or both of (i) a predicted count interval 520 predicting cumulative occurrences for the prediction time period, and (ii) a predicted count interval 520 predicting time-specific occurrences over the prediction time period for each behavioral activity. Generally, a predicted count interval 520 comprises a predicted minimum (e.g., lower bound) and a predicted maximum (e.g., upper bound) number of occurrences of the behavioral activity.

Specifically in the illustrated embodiment of FIG. 5B, the prediction interval profile comprises multiple time-specific predicted count intervals for the given behavioral activity for different portions of the prediction time window. In an example embodiment, the given behavioral activity is movement detected by a motion sensor (e.g., configured to binarily classify movement in an environment). For illustrative purposes, a first predicted count interval 520A is indicated in FIG. 5B, with the first predicted count interval 520A being specific to the $8^{th}$ hour of the prediction time window. As shown, the first predicted count interval 520A is used to predict that, at the $8^{th}$ hour of the prediction time window, the given behavioral activity will occur between approximately 5 times and approximately 85 times. A second predicted count interval 520B is further indicated in FIG. 5B as an illustrative example, with the second predicted count interval 520B being specific to the $13.5^{th}$ hour of the prediction time window. As illustrated, the second predicted count interval 520B represents a prediction that the given behavioral activity will occur between approximately 30 times and approximately 80 times.

While not explicitly illustrated, the prediction interval profile may in some embodiments include time-specific predicted count intervals for each portion of the prediction time window, in the illustrated embodiment. Understood alternatively, the prediction interval profile comprises one predicted count interval with a time-dependent or time-variable minimum and a time-dependent or time-variable maximum, and such a minimum and such a maximum may be a piece-wise (e.g., as illustrated) function, a discrete function, a continuous function, and/or the like.

While FIG. 5B illustrates various time-specific predicted count intervals, the prediction interval profile may additionally or alternatively comprise a cumulative predicted count interval. That is, the prediction interval profile may predict that the given behavioral activity will occur between approximately 50 times and approximately 100 times (not explicitly illustrated) over the entirety of the prediction time window.

Thus, with predicted count intervals 520, a prediction interval profile is configured to predict and classify counts of occurrences of the behavioral activity within the prediction time window. In the illustrated embodiment, the given behavioral activity is determined to not satisfy the predicted count intervals 520 at three different times of the prediction time window. Specifically, the given behavioral activity occurs an abnormally high number of times (e.g., relative to the predicted number of occurrences described by the predicted count intervals 520) at the $17^{th}$ hour, the $17.5^{th}$ hour, and the $21^{st}$ hour of the prediction time window. At each of the $17^{th}$ hour, the $17.5^{th}$ hour, and the $21^{st}$ hour of the prediction time window, the prediction interval profile may be configured to classify the given behavioral activity as behavioral deviation 504, in some embodiments.

In various embodiments, a predicted count interval for the given behavioral activity may generally be generated in accordance with the above-described Equation 1. In the context of generation of a predicted count interval, y represents an average count of historical occurrences 502 in respective historical time periods, and the predicted count interval 520 may be centered around the average count. In the previously-discussed example of a cumulative predicted count interval spanning from 50 occurrences to 100 occurrences, the behavioral activity may have occurred an average of 75 times across the historical time periods. That is, an average historical time period includes 75 occurrences of the behavioral activity, in this example. For a time-specific predicted count interval, the average count may be specific to the time of the historical time periods. For example, the first predicted count interval 520A for the $8^{th}$ hour of the prediction time window may be based at least in part on an average count of 45 occurrences at the $8^{th}$ hour of the historical time periods.

In the context of generation of predicted count intervals 520, the meaning of to and n remain the same. Meanwhile, σ, which as discussed generally describes standard deviation, may specifically refer to the standard deviation of occurrence counts across historical time periods in the context of generating predicted count intervals 520. In general then, the prediction interval profile, or the predicted timing intervals 510 and the predicted count intervals 520 thereof, are generated based at least in part on Equation 1, in various embodiments.

As discussed, generation of the prediction interval profile may require historical data for historical time periods from which average timing, average counts, standard deviations, and/or the like are extracted. Historical data for specifically selected historical time periods may be used in various embodiments. As will be understood, behavioral predictions (e.g., predicted timing intervals 510, predicted count intervals 520) may have improved accuracy when generated based at least in part on historical data from historical time periods that are specifically relevant and/or similar to the prediction time window. Thus, habitual and routine behavior of the individual can be understood in the context of behavioral predictions.

In particular, historical time periods that be used for the generation of the prediction interval profile may be specifically selected using a time clustering machine learning model. The time clustering machine learning model may be a data entity that is configured to group or cluster time periods according to one or more time period features. That is, a time clustering machine learning model may output clusters of time periods, and a cluster includes time periods that are similar in the one or more time period features. In various embodiments, the one or more time period features include week positions (e.g., Mondays are clustered together, Tuesdays are clustered together, etc.), months, seasons, and/or the like. Further, time periods can be clustered based at least in part on observed activity counts and observed activity timings. For example, in an exemplary embodiment, days with similar activity counts are clustered together, which may indicate higher-level patterns such as repeated behavior. Various other aspects associated with each time period, such as weather, can be used to cluster time periods together. Generally then, the time clustering machine learning model is configured to extract or determine time period features from a plurality of time periods in order to cluster the plurality of time periods into one or more clusters. In various embodiments, historical time periods belonging to a cluster that includes the prediction time period are used for generating the prediction interval profile, as the behavior during the prediction time period may be similar to the behavior during the historical time periods.

FIG. 6 illustrates an example time clustering machine learning model 600 configured to cluster and group time periods according to various features, and the time clustering machine learning model 600 may be used to identify historical time periods and historical data thereof for the generation of the prediction interval profile (e.g., including the predicted timing intervals 510 and the predicted count intervals 520). In the illustrated embodiment, the time periods are clustered based at least in part on two dimensions, which may be a feature or combination of features. In one example embodiment, the time periods are clustered according to t-distributed stochastic neighbor embedding (t-SNE).

In the illustrated embodiment, a particular Monday time period and a particular Tuesday time period are shown to be belonging to a first cluster 602A, while a Saturday time period and a Sunday time period are shown to be belonging to a second cluster 602B. For example, in the illustrated embodiment, the time clustering machine learning model 600 is configured to cluster time periods according to observed and/or predicted activity counts, and the resulting clusters 602 indicate that the individual may behave in a particular manner during weekdays while behaving different during weekends. The time clustering machine learning model 600 may generally cluster time periods according to observed activity counts and/or observed activity timings to uncover high-level patterns or similarities in the behavior of the individual across time periods. As another example, the time clustering machine learning model 600 may describe the individual behaving in a particular manner during time periods of high temperatures and in a different manner for time periods of low temperatures.

Thus, with clusters 602 generated by the time clustering machine learning model 600, similarities or correlations between time periods can be determined, and historical time periods belonging to a cluster that describes the prediction time period can be used to generate the prediction interval profile. For example, returning to the illustrated embodiment, historical data from historical time periods belonging to the first cluster 602A may be used to generate the prediction interval profile for a prediction time window that is known to be a weekday.

Returning to FIG. 4, process 400 further comprises step/operation 403. Step/operation 403 comprises receiving sensor data for the prediction time window. In various embodiments, the system computing entity 101 receives sensor data directly from sensors 103. In other example embodiments, the system computing entity 101 receives sensor data from the client computing entity 102 via network interface 220, the sensor data originating from the sensors 103. In further example embodiments, the client computing entity 102 receives sensor data from the sensors 103. In various embodiments, the prediction time window is a current time window and the sensor data is received in real-time.

Process 400 further includes step/operation 404, which includes extracting observed activity counts and observed activity timings for each behavioral activity from the received sensor data. In various embodiments, the system computing entity 101 is configured to extract observed activity counts and observed activity timings from the received sensor data. In some embodiments, the system computing entity 101 receives observed activity counts and observed activity timings from the client computing entity 102. As discussed, a behavioral activity may be defined by particular data values, particular data patterns, and/or the like, and thus, step/operation 404 may comprise parsing the received sensor data for such particular data values and data patterns. For example, in an exemplary embodiment, for a behavioral activity of opening a refrigerator door defined by a sensor value of "1", the sensor data is parsed to determine a number of occurrences of the sensor value of "1" and to determine a time for the occurrences. Thus, for each of the set of behavioral activities, an observed activity count is determined and an observed activity timing is determined and extracted from the received sensor data for the prediction time window.

At step/operation 405, the system computing entity 101 and/or the client computing entity 102 determines (i) whether the observed activity count for a particular behavioral activity satisfies the predicted count interval for the particular behavioral activity, and/or (ii) whether the observed activity timing for the particular behavioral activity satisfies the predicted timing interval for the particular behavior activity. For instance, the observed activity count and the observed activity timing for each behavioral activity may be provided to the prediction interval profile, and the prediction interval profile may be configured to compare the observed activity count with predicted count intervals and to compare the observed activity timing with predicted timing intervals. The prediction interval profile may then be configured to, for each behavioral activity, determine whether the observed activity count for the behavioral activity satisfies the predicted count interval for the behavioral activity, and/or whether the observed activity timing for the behavioral activity satisfies the predicted timing interval for the behavior activity.

Referring again to the lower plot of FIG. 5A, the observed activity timing for the given behavioral activity may be at approximately 7.5 hours into the prediction time window, and the prediction interval profile determines that the observed activity timing of approximately 7.5 hours does not satisfy the predicted timing interval 510 of 7.75 hours to 10.5 hours. As such, the prediction interval profile may classify the given behavioral activity (or the occurrence thereof at approximately 7.5 hours) as a behavioral deviation 504. Similarly, as an example, the observed activity count for a behavioral activity may be 30 occurrences, and the prediction interval profile determines that the observed activity count does not satisfy a cumulative predicted count interval of 50 occurrences to 100 occurrences. The prediction interval profile may then classify the behavioral activity as a behavioral deviation 504.

As shown in FIG. 4, the prediction interval profile determines satisfaction of the predicted count interval and the predicted timing interval for each behavioral activity. Thus, if the predicted count interval and the predicting timing interval for a particular behavioral activity is determined to be satisfy by the observed activity count and the observed activity timing at step/operation 405, step/operation 405 may be performed again for the next behavioral activity until each of the set of behavioral activates has been evaluated.

Otherwise, if it is determined (e.g., by the prediction interval profile) that the predicted count interval and the predicted timing interval for a particular behavioral activity is not satisfied by the observed activity count and the observed activity timing within the prediction time window, then step/operation 406 may be performed. Step/operation 406 comprises classifying the particular activity as a behavioral deviation 504. In various embodiments, classification of the particular activity as a behavioral deviation 504 may comprise generation and association of a tag, flag, indicator, and/or the like with the particular behavioral activity. In some embodiments, a list of behavioral deviations 504 is dynamically updated as each of the set of behavioral activities is evaluated. In various embodiments, the system computing entity 101 and/or the client computing entity 102 records the behavioral deviation 504 and/or maintains the list of behavioral deviations 504.

Process 400 further comprises step/operation 407, which comprises performing one or more automated actions based at least in part on the behavioral deviation 504, or rather the classification of the particular behavioral activity as a behavioral deviation 504. Various automated actions may be performed by the system computing entity 101, such as providing alerts to various different client computing entities 102 associated with different entities involved in the behavior monitoring of the individual. Various automated actions may additionally or alternatively be performed by the client computing entity 102, such as alerting the individual to the individual's own behavioral deviations. In various embodiments, classification of the particular behavioral activity as a behavioral deviation 504 causes prompt and/or immediate transmission of an alert or a notification to the client computing entity 102 associated with the individual indicating the behavioral deviation 504. For example, the alert may comprise a message indicating that the individual performed a certain behavioral activity an abnormally high number of times and/or that the individual performed a certain behavior activity abnormally late within the prediction time window. In various embodiments, step/operation 407 may be performed as each behavioral activity is evaluated (e.g., iteratively at step/operation 405). In various embodiments, one or more automated actions are performed based at least in part on certain behavioral activities, a certain number of behavioral activities, a certain combination of behavioral activities, and/or the like, being classified as behavioral deviations 504. For instance, an automated action may be performed according to a determination that the number of behavioral activities classified as behavioral deviations 504 satisfies a threshold (e.g., a threshold number of behavioral deviations 504 are identified).

In some embodiments, the alert or the notification provided to the individual via the client computing entity 102 comprises a survey and/or a mechanism through which the individual is enabled to provide user input, such as user input that comprises a self-report of the individual's condition or behavior. FIG. 7 illustrates an example of a survey 700 automatically provided to the individual (e.g., transmitted to the client computing entity 102 associated with the individual) upon classification of a behavioral activity as a behavioral deviation 504. For example, in an exemplary embodiment, the behavioral deviation 504 is determined to be indicative of a health condition (e.g., cognitive decline) of the individual, and the survey 700 enables the individual to provide more information such that additional evidence of the health condition can be determined. Using cognitive decline as an example, the example survey 700 of the illustrated embodiment comprises a query for a self-evaluation of the individual's memory, and the example survey 700 may be provided based at least in part on abnormal behaviors, such as certain behavioral activities having lower occurrence counts (e.g., due to memory loss of the individual) and having later activity timings.

In various embodiments, the one or more automated actions performed at step/operation 407 may involve other entities that have an interest in behavioral monitoring of the individual. For instance, the alert or the notification may be provided to a family member of the individual, a custodian of the individual, a hospital worker, and/or the like. In various embodiments, a user interface providing behavioral data for the individual to another entity may be updated at step/operation 407, an example user interface 800 being illustrated in FIG. 8.

In various embodiments, the user interface 800 is updated to include observed activity counts and observed activity timings (e.g., extracted in step/operation 404) for the behavioral activities and may be further configured to indicate a particular sensor from which the sensor data originated. In various embodiments, the user interface 800 is further configured to indicate the predicted timing intervals 510 and the predicted count intervals 520 for a prediction time window. In various embodiments, the user interface 800 further indicates a historical record of identified behavioral deviations 504.

Thus, various embodiments of the present disclosure address technical challenges related to identifying deviations in behavior of an individual. In particular, various embodiments improve the accuracy of behavioral deviation detection and classification due at least in part to prediction and observation of both a count and a timing of occurrences of behavioral activities. Examination of when a behavioral activity occurs for different time periods provides increased information significance in instances in which the behavioral activity has low frequency of occurrence (e.g., once a day). Improved accuracy in detection and classification of behavioral deviations enables conservation of data storage space and computing resources. Further, specific selection of historical data for generation of behavioral predictions maintains classification accuracy in instances in which low quantities of historical data are available and also enables conservation of data storage space.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method comprising:
accessing, by one or more processors, first sensor data indicative of a behavioral activity of a user during a historical time period;
generating, by the one or more processors and based at least in part on the first sensor data, a prediction interval profile for the behavioral activity, the prediction interval profile comprising (1) a predicted timing interval within a prediction time period for the behavioral activity that is established based at least in part on an amount of the first sensor data and (2) a predicted count interval within the predicted timing interval, wherein a length of the predicted timing interval is dynamically determined based at least in part on the amount of the first sensor data indicative of the behavioral activity;
receiving, by the one or more processors, second sensor data of the user for the prediction time period;
determining, by the one or more processors and based at least in part on the second sensor data, an observed activity count and an observed activity timing for the behavioral activity;
determining, by the one or more processors, a behavioral deviation by classifying the behavioral activity as the behavioral deviation based at least in part on the prediction interval profile and the observed activity count for the behavioral activity or the observed activity timing for the behavioral activity; and
performing, by the one or more processors, one or more automated actions based at least in part on the behavioral deviation.

2. The computer-implemented method of claim 1, wherein classifying the behavioral activity as the behavioral deviation is performed according to at least one of (i) a first determination that the observed activity count does not satisfy the predicted count interval for the behavioral activity, or (ii) a second determination that the observed activity timing does not satisfy the predicted timing interval for the behavioral activity.

3. The computer-implemented method of claim 1, wherein the historical time period is identified based at least in part on being associated with a cluster of time periods defined by a time clustering machine learning model, the cluster of time periods comprising the prediction time period.

4. The computer-implemented method of claim 3, wherein the time clustering machine learning model is configured to cluster a plurality of time periods based at least in part on one or more time period features comprising an activity count profile of each of the plurality of time periods and an activity timing profile of each of the plurality of time periods.

5. The computer-implemented method of claim 4, wherein the plurality of time periods comprises the historical time period and the prediction time period, and each of the plurality of time periods spans a particular day.

6. The computer-implemented method of claim 1, wherein the predicted count interval is generated based at least in part on an average activity count for the historical time period and a variation of activity count for the historical time period, and wherein the predicted timing interval is generated based at least in part on an average activity timing for the historical time period and a variation of activity timing for the historical time period.

7. The computer-implemented method of claim 1, wherein the one or more automated actions comprise transmitting an indication of the behavioral deviation to a client computing entity associated with an individual.

8. The computer-implemented method of claim 1, wherein accessing the first sensor data comprises identifying the first sensor data for the historical time period associated with the prediction time period from a plurality of historical time periods.

9. The computer-implemented method of claim 1, wherein the predicted count interval comprises (i) at least one of a predicted cumulative count interval for the prediction time period or one or more predicted time-specific count intervals corresponding to one or more discrete portions of the prediction time period and (ii) a predicted minimum and a predicted maximum number of occurrences of each behavioral activity.

10. A computing system comprising one or more processors and memory comprising computer program code, the memory and the computer program code configured to, with the one or more processors, cause the computing system to:
    access first sensor data indicative of a behavioral activity of a user during a historical time period;
    generating, based at least in part on the first sensor data, a prediction interval profile for the behavioral activity, the prediction interval profile comprising (1) a predicted timing interval within a prediction time period for the behavioral activity that is established based at least in part on an amount of the first sensor data and (2) a predicted count interval within the predicted timing interval, wherein a length of the predicted timing interval is dynamically determined based at least in part on the amount of the first sensor data indicative of the behavioral activity;
    receive second sensor data of the user for the prediction time period;
    determine, based at least in part on the second sensor data, an observed activity count and an observed activity timing for the behavioral activity;
    determine a behavioral deviation by classifying the behavioral activity as the behavioral deviation based at least in part on the prediction interval profile and the observed activity count for the behavioral activity or the observed activity timing for the behavioral activity; and
    perform one or more automated actions based at least in part on the behavioral deviation.

11. The computing system of claim 10, wherein to determine the behavioral deviation, the one or more processors are further caused to determine the behavioral deviation according to at least one of (i) a first determination that the observed activity count does not satisfy the predicted count interval for the behavioral activity, or (ii) a second determination that the observed activity timing does not satisfy the predicted timing interval for the behavioral activity.

12. The computing system of claim 10, wherein the historical time period is identified based at least in part on being associated with a cluster of time periods defined by a time clustering machine learning model, the cluster of time periods comprising the prediction time period.

13. The computing system of claim 12, wherein the time clustering machine learning model is configured to cluster a plurality of time periods based at least in part on one or more time period features comprising an activity count profile of each of the plurality of time periods and an activity timing profile of each of the plurality of time periods.

14. The computing system of claim 13, wherein the plurality of time periods comprises the historical time period and the prediction time period, and each of the plurality of time periods spans a particular day.

15. The computing system of claim 10, wherein the predicted count interval is generated based at least in part on an average activity count for the historical time period and a variation of activity count for the historical time period, and wherein the predicted timing interval is generated based at least in part on an average activity timing for the historical time period and a variation of activity timing for the historical time period.

16. The computing system of claim 10, wherein to perform the one or more automated actions, the one or more processors are further configured to: transmit an indication of the behavioral deviation to a client computing entity associated with an individual.

17. A non-transitory computer-readable medium comprising executable portions configured to cause one or more processors to:
    access first sensor data indicative of a behavioral activity of a user during a historical time period;
    generate, based at least in part on the first sensor data, a prediction interval profile for the behavioral activity, the prediction interval profile comprising (1) a predicted timing interval within a prediction time period for the behavioral activity that is established based at least in part on an amount of the first sensor data and (2) a predicted count interval within the predicted timing interval, wherein a length of the predicted timing interval is dynamically determined based at least in part on the amount of the first sensor data indicative of the behavioral activity;
    receive second sensor data of the user for the prediction time period;
    determine, based at least in part on the second sensor data, an observed activity count and an observed activity timing for the behavioral activity;
    determine a behavioral deviation by classifying the behavioral activity as the behavioral deviation based at least in part on the prediction interval profile and the observed activity count for the behavioral activity or the observed activity timing for the behavioral activity; and
    perform one or more automated actions based at least in part on the behavioral deviation.

18. The non-transitory computer-readable medium of claim 17, wherein to determine the behavioral deviation, the one or more processors are further caused to determine the behavioral deviation according to at least one of (i) a first determination that the observed activity count does not satisfy the predicted count interval for the behavioral activity, or (ii) a second determination that the observed activity timing does not satisfy the predicted timing interval for the behavioral activity.

19. The non-transitory computer-readable medium of claim 17, wherein the historical time period is identified based at least in part on being associated with a cluster of time periods defined by a time clustering machine learning model, the cluster of time periods comprising the prediction time period.

20. The non-transitory computer-readable medium of claim 19, wherein the time clustering machine learning model is configured to cluster a plurality of time periods based at least in part on one or more time period features comprising an activity count profile of each of the plurality of time periods and an activity timing profile of each of the plurality of time periods.

* * * * *